United States Patent

[11] 3,590,982

[72] Inventor John D. Banyas
  Toledo, Ohio
[21] Appl. No. 825,850
[22] Filed May 19, 1969
[45] Patented July 6, 1971
[73] Assignee Owens-Illinois, Inc.

[54] ARTICLE TRANSFER APPARATUS
  13 Claims, 15 Drawing Figs.
[52] U.S. Cl. .................................................... 198/179,
  198/20, 214/1
[51] Int. Cl. ...................................................... B65g 15/00
[50] Field of Search ......................................... 198/179,
  180, 30, 22, 22 B, 75, 102; 214/1, 1 B, 3

[56] References Cited
UNITED STATES PATENTS
3,125,369 3/1964 Copping ........................ 198/179 X
3,467,240 9/1969 Jensen et al. .................. 198/179

Primary Examiner—Evon C. Blunk
Assistant Examiner—Alfred N. Goodman
Attorneys—John R. Nelson and Edward J. Holler ABSTRACT: Apparatus for transferring bulblike glass articles from a ribbon-type forming machine to a receiving conveyor. The transfer apparatus includes a plurality of individual transfer devices mounted for movement along an endless rectangular path, one run of which extends in parallel operative relationship with the article-forming ribbon machine and another run of which extends in parallel operative relationship with a receiving conveyor. The individual transfer devices include an open-ended U-shaped article support yoke and a pair of article retainer fingers both mounted upon a carrier member mounted upon a carriage which is in turn mounted upon a bracket driven in movement along the generally rectangular endless path referred to above. The bracket is supported for vertical movement as it moves along its path, while the carriage is mounted on the bracket so that it may be extended or withdrawn horizontally in a direction normal to the path of movement of the bracket along its endless path. The carrier is in turn slidably mounted on the carriage for sliding movement parallel to the path of movement of the carriage on the bracket. Movement of the carrier relative to the bracket is confined to a range less than that of the movement of the carriage relative to the bracket, the excess movement or overtravel of the carriage as compared to the carrier being employed to open and close the retainer fingers at selected portions of the endless path. Vertical movement of the bracket and extending or withdrawing movement of the carriage upon the bracket is accomplished by means of cams mounted upon the frame of the transfer machine.

PATENTED JUL 6 1971
3,590,982
SHEET 1 OF 7
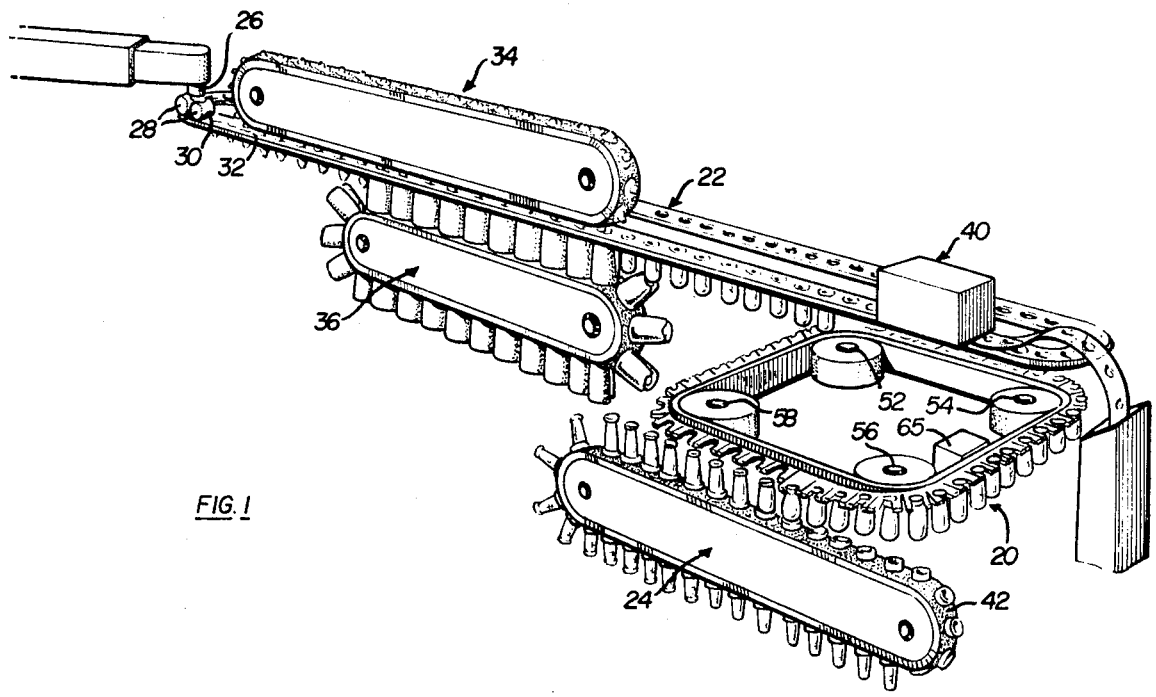
FIG. 1
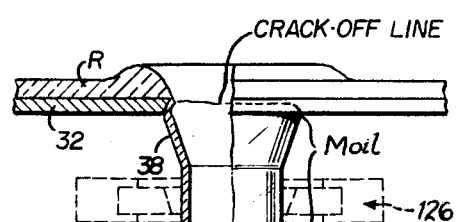
FIG. 2
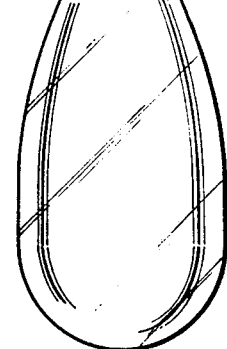
INVENTOR
JOHN D. BANYAS.
BY J. R. Nelson and
E. J. Holler
ATT'Y.

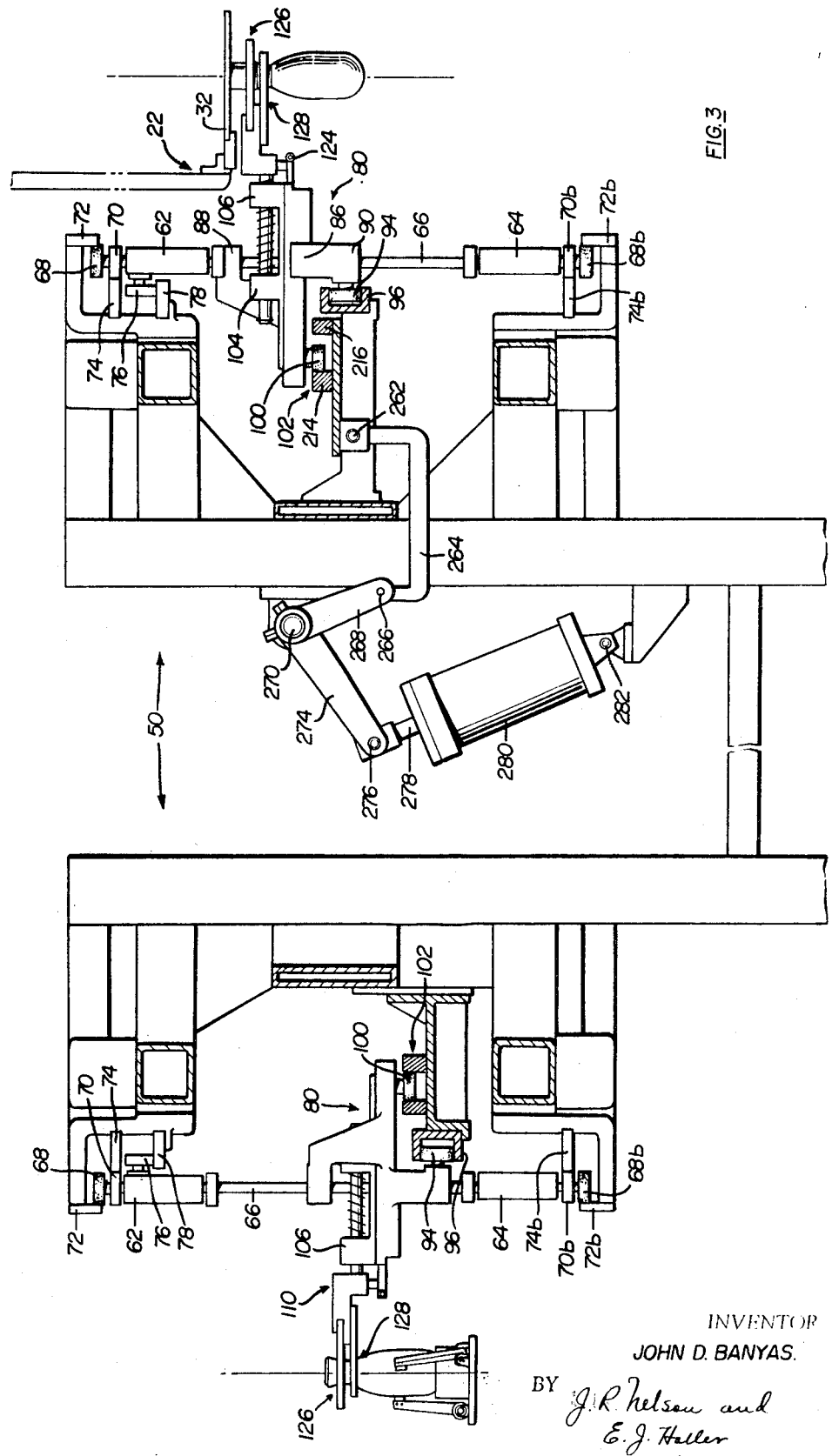

INVENTOR
JOHN D. BANYAS.
BY J. R. Nelson and
E. J. Holler
ATT'Y.

INVENTOR
JOHN D. BANYAS.
BY J.R. Nelson and
E.J. Haller
ATT'Y.

INVENTOR
JOHN D. BANYAS.

ARTICLE TRANSFER APPARATUS

BACKGROUND OF THE INVENTION

The present invention is designed for employment in a container-forming operation in which a bulblike glass bottle is formed on a forming machine of the so-called "ribbon" type. Ribbon machines have long been employed in the formation of the glass envelope of electric light bulbs, and thus are well adapted for use in the formation of the glass portion of the composite container which is the subject of U.S. Pat. No. 3,372,826. Basic advantages of the employment of a ribbon machine for this purpose are its high production rate and its ability to form a seamless glass container.

In most prior production facilities in which ribbon machines were employed, the article, which is formed integrally with a glass ribbon, is severed from the ribbon at the discharge end of the ribbon machine and dropped onto a collecting table or conveyor which then feeds the article for subsequent processing, i.e. annealing and packing, in random fashion. This particular method results in a substantial amount of breakage, but is considered acceptable because of the high production rate of the forming machine.

In the particular system for which the present invention was designed, the amount of breakage resulting from the conventional severing process described above is not economically acceptable, and hence the present machine is designed to enable the transfer of articles from the ribbon machine to the next work station with a minimum of breakage and also provides desired orientation of the articles for processing at the next work station.

SUMMARY OF THE INVENTION

In the present invention, the molds associated with the ribbon machine are designed to form the bulblike bottle or article with an integral moil or waste portion which suspends the formed article from the glass ribbon of the ribbon machine. The severing of the article from the ribbon is accomplished by severing or "cracking off" the upper end of the moil from the ribbon, so that the article, as severed from the ribbon, includes an integral upwardly extending moil which is utilized to permit the article to be handled by the transfer machine of the present invention without requiring the article-engaging elements of the transfer machine to contact any portion of the ultimate article.

The transfer machine of the present invention takes the form of an endless chain conveyor mounted for movement along an endless generally rectangular path. The chain assembly of this conveyor consists of vertically spaced upper and lower chains, between which a plurality of vertical rods extend at uniformly spaced positions. The vertical rods carry individual transfer devices, each of which consist of a bracket member slidably mounted upon and between two adjacent vertical rods of the chain assembly. A roller on the bracket is received with a cam track on the machine frame so that the bracket is raised and lowered as it is driven along the chain path. A carriage is slidably mounted upon each bracket for horizontal sliding movement in a direction normal to the path of movement of the chain assembly, and a second roller upon the carriage is engaged with a cam track on the machine frame to position the carriage in an extended or retracted relationship relative to the chain path at appropriate points along the path. A carrier member is mounted upon the carriage for sliding movement relative to the carriage parallel to the direction of movement of the carriage upon the bracket. The carrier member carries an open-ended yoke member which is engageable with an outwardly inclined or bulged portion of the moil of an article to support the article from the yoke. Below the yoke, a pair of cooperating retainer fingers are pivotally mounted upon the carrier member for movement between an open position and an article retaining closed position. The carrier member is provided with an element engageable with a stop member on the bracket to establish the fully extended position of the carrier member, its yoke and retainer fingers, relative to the path of movement of the chain assembly of the transfer device. Outward movement of the carriage relative to the chain path after the carrier element has engaged the stop on the bracket is employed to move the retainer fingers from their opened to the closed position, withdrawing movement of the carriage relative to the bracket over this range being employed to open the fingers.

The machine is further provided with a retractable cam section along that portion of the chain path which extends parallel to the path of movement of articles on the ribbon conveyor. The retractable cam section, when retracted acts to maintain the transfer devices withdrawn clear of the path of movement of articles on the ribbon conveyor, this feature being employed during the initial startup of the ribbon conveyor to prevent the transfer of malformed articles which occurs until the article-contacting parts of the ribbon machine have been heated to their normal operating temperature.

Other objects and features of the invention will become apparent by reference to the following specification and to the drawings.

IN THE DRAWING

FIG. 1 is a schematic diagram in perspective showing the overall relationship between the transfer machine of the present invention, the ribbon machine and the receiving conveyor;

FIG. 2 is a detail view, with certain parts broken away or shown in section, showing the relationship between the formed article, the glass ribbon, and a plate of the ribbon conveyor prior to the severence of the article from the ribbon;

FIG. 3 is a transverse cross-sectional view of the transfer machine, with the central portion of the machine largely omitted, showing the relationship between the operative parts of the transfer machine with the ribbon conveyor (right-hand side) and burnoff conveyor (left-hand side);

GENERAL DESCRIPTION OF SYSTEM

Figure 6:
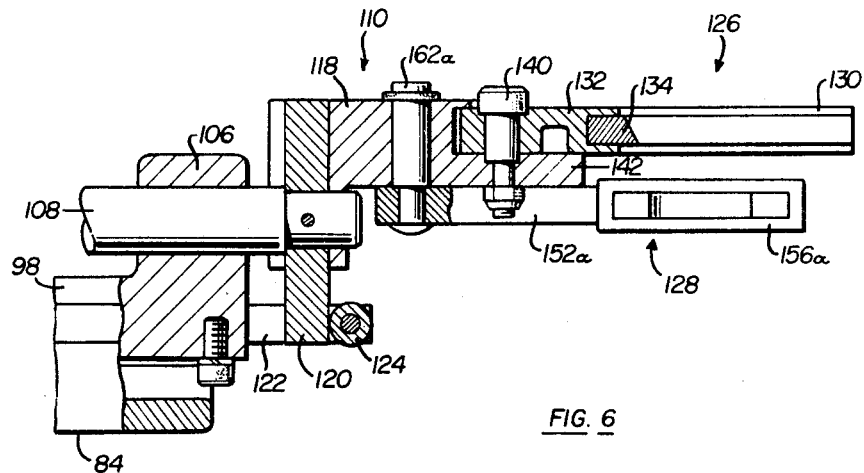
FIG. 6 is a detail cross-sectional view taken approximately on line 6-6 of FIG. 5 and showing details of the carrier assembly.
Figure 4:
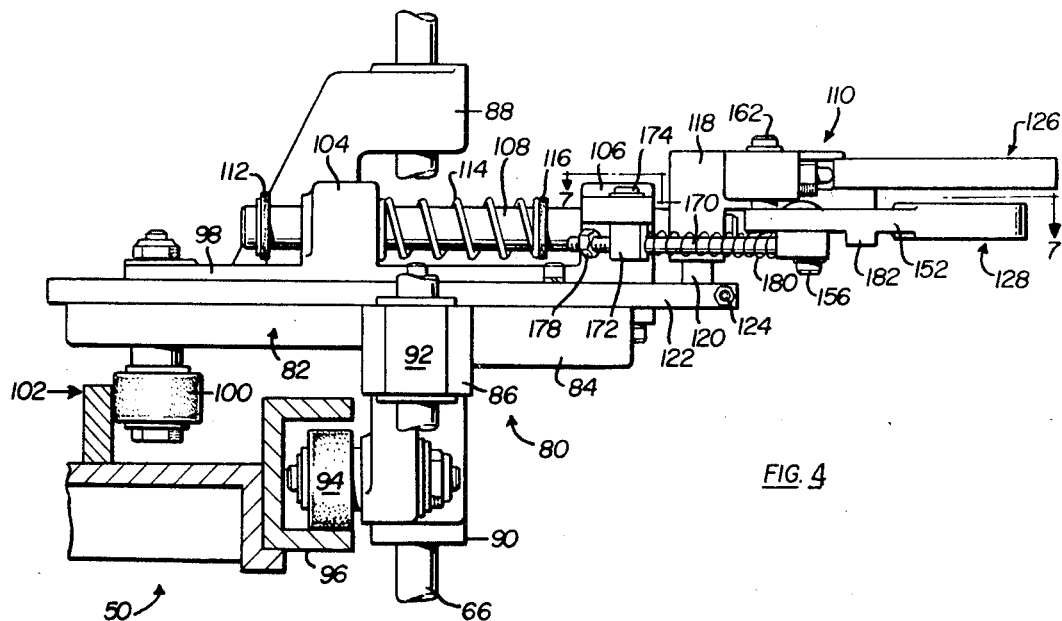
FIG. 4 is a side elevational view of a transfer device, with certain parts broken away.

The present invention directly concerns a transfer machine designated generally 20 (FIG. 1) which functions to transfer blown glass articles from a so-called ribbon machine designated generally 22 on which the articles are formed, to a burnoff machine designated generally 24 which burns off or separates the moil portion which is attached to the article when it is removed from the ribbon machine.

Neither the ribbon machine 22 or the burnoff machine 24 form a part of the present invention, however, because the transfer machine 20 must accommodate itself to certain structural and functional characteristics of the ribbon machine and burnoff machine, a brief description of these latter two machines will assist in clarifying the structure and operation of transfer machine 20.

Ribbon machine 22 takes the form of a more or less conventional ribbon machine of the type usually employed in the manufacture of electric light bulbs. A typical example of a machine of this type is described in detail in U.S. Pat. No. 1,790,397.

In a ribbon machine of this type under consideration, a steady stream of molten glass is discharged at a controlled rate from the nozzle 26. The stream of molten glass G drops from the nozzle downwardly between a pair of rollers 28 one of which is formed with recesses 30, which lay the molten glass down in a continuous ribbon upon an endless belt or chain 32 which consists of a series of flat plates, each having an orifice on the order of 1 to 2 inches in diameter. The recesses 30 on one of the two rolls 28 from thickened portions or "patties" in the continuous glass ribbon deposited upon chain 32, and the action of rollers 28 and the chain are synchronized so that the patties overlie the orifices in the plates of chain 32.

As the patties are advanced on chain 32 away from nozzle 26, they begin to slump downwardly through the orifices of the chain which subsequently passes into operative relationship with a blow-head turret designated generally 34 driven in synchronism with chain 32. The blow-heads on turret 34 move into alignment with the orifices in the plates of the ribbon chain 32 and initially blow downwardly onto the slumping pattie to form a parison which is suspended beneath the plate by virtue of the fact that it is still connected to the continuous ribbon of glass supported upon the ribbon chain.

The suspended parisons then move into operative relationship with a series of blow molds mounted upon a blow mold turret 36 and driven in synchronism with ribbon chain 32. The blow molds close about the individual parisons which are then blown by the blow-head turret into their final configuration against the inner walls of the blow molds on turret 36. In machines of this type, the interior walls of the blow molds are coated with a paste and the molds are rotated during the final blowing operation to produce an article which does not have any mold seams. Further advancement of the chain carries the blown article beyond the blow mold turret, the molds opening to clear the article, and the completed blank, still connected to the glass ribbon lying on top of chain 32, is advanced toward transfer machine 20.

Referring briefly to FIG. 2, when the blown article is advanced to the right as viewed in FIG. 1, beyond the blow mold turret, the article is still integrally connected to the ribbon R by an integral moil portion which is later severed from the article by burnoff machine 24. The moil is a waste portion, and since it does not form a portion of the ultimate article, the transfer machine 20 is designed to handle the article by its moil portion during the transfer of the article from ribbon machine 22 to burnoff machine 24. To facilitate handling of the article by the transfer machine, the moil is formed with an outwardly bulged upper portion as at 38 to provide a shoulder by means of which the article can be suspended from a support yoke, to be described below, on the transfer machine.

As the ribbon chain 32 carries the article into operative relationship with the transfer machine, the article is separated from the ribbon by severing or cracking off the upper end of the moil from the ribbon approximately at the crackoff line indicated in FIG. 2. This operation may be performed in several different ways, as by a rotating knife assembly (see U.S. Pat. No. 1,790,397), a stationary plow-type knife or by vibrating the individual plates of chain 32. Because any of several different types of crackoff means may be employed, a crackoff device has been schematically indicated at 40 in FIG. 1.

The transfer device will be described in detail below, and for purposes of this general description, consists basically of an endless conveyor movable along a generally rectilinear path, one run of which passes in operative relationship to chain 32 so that the transfer machine can receive the articles from ribbon machine 22 as they are cracked off from the ribbon by the means 40. The transfer machine 20 then conveys the article, in an elevated position, around two corners to another run which extends in parallel overlying relationship with an endless conveyor 42 which forms a part of burnoff machine 24.

Conveyor 42 includes a series of flat horizontal plates hingedly connected to each other in an endless chain, each plate having a cuplike seat 44, upon which the lower end of the article rests, and three or more upwardly projecting clamping fingers 46 pivoted on the plate. The fingers are actuated by suitable means, not shown, between an open position which permits an article to be lowered, with clearance, downwardly between the open fingers into seated supporting engagement upon the seat, and a clamped position in which fingers 46 are moved inwardly to grip and support the article from symmetrically spaced positions around the article periphery.

As the articles are conveyed by the transfer machine above the upper run of conveyor 42, the transfer machine lowers the articles through the open clamping fingers onto the seats which are conveyed by conveyor 42 in synchronism with the transfer machine. The clamping fingers are then closed, and the supporting device on the transfer machine is disengaged from the article after it has been clamped in position upon conveyor 42. Conveyor 42 then conveys the article to the burnoff device which severs the moil from the article.

TRANSFER MACHINE CONVEYOR STRUCTURE

Referring now to FIGS. 1 and 3, transfer machine 20 includes a suitably designed fixed framework designated generally 50 upon which four sets of guide wheel assemblies 52, 54, 56 and 58 are mounted for free rotation about vertical axes. Each of the guide wheel assemblies defines one corner of a generally rectilinear path along which an endless conveyor is driven in the indicated direction by schematically illustrated drive means 60. The guide wheel assemblies 52, 54, 56 and 58 are similar and include vertically spaced upper and lower guide wheels mounted for coaxial rotation. The guide wheel assemblies engage and guide rollers 70 and 70b (described below) on endless chains 62 and 64 respectively which consist of a plurality of individual links pivotally connected to each other by elongate vertical rods 66 which extend through both upper and lower chains 62 and 64 and span the entire space between the two chains.

The chains 62 and 64 are driven along the generally rectangular path in continuous movement synchronized with the ribbon machine by a drive means schematically indicated at 65 in FIG. 1.

Referring now to FIG. 3, it is seen that each rod 66 projects above upper chain 62 and below lower chain 64. A pair of guide rollers 68 and 70 are rotatably mounted upon each rod 66 above upper chain 62, the roller 68 being maintained in rolling engagement with an outer guide track 72 fixedly mounted upon conveyor frame 50, while the lower guide roller 70 is located in rolling engagement with an inner guide track 74 likewise mounted upon frame 50. A similar arrangement is is employed at the lower end of each rod 66, corresponding reference numerals with the subscript "b" being employed to indicate corresponding parts of the lower arrangement. At each corner of the endless path, wheel portions of the guide wheel assemblies take over the function of tracks 74 and 74b.

It is believed apparent that the guide roller and track assembly just described establish a path of movement of the rods 66 with a high degree of precision, the roller engaging surfaces of tracks 72 and 74 being so spaced as to simultaneously engage their respective guide rollers.

Another set of guide roller 76 are mounted upon the links of upper chain 62 for rotation about horizontal axes and roll upon an underlying support track 78, fixedly mounted upon frame 50, to establish the vertical position of the assembly consisting of chains 62 and 64 and rods 66.

Rods 66 carry a plurality of transfer devices designated generally 80 and support the devices 80 for vertical sliding movement in a manner described in more detail below.

STRUCTURE OF TRANSFER DEVICE 80

Referring now particularly to FIGS. 4 through 7, each transfer device 80 includes a bracket assembly designated generally 82 having a main body portion 84 formed with a forwardly extending projection 86 and rearwardly projecting upper and lower bushing supports 88 and 90 respectively. Coaxially located bushings in upper and lower bushing supports 88 and 90 slidably receive one rod 66, while the next adjacent rod 66 is slidably received within a floating bushing 92 mounted in projection 86 for horizontal sliding movement toward and away from the main body portion 84 of bracket 82. The forward or floating bushing 92 of each transfer assembly is slidably received upon a rod 66 vertically between the upper and lower bushing supports 88 and 90 of the next forwardmost transfer device 80.

A support roller 94 is rotatably mounted on the body 84 of each bracket device and rides along a cam track 96 fixedly mounted upon conveyor frame 50 to position the bracket vertically on rods 66. Transfer devices 82 are shifted vertically along rods 66 in accordance with the elevation of cam track 96, which varies in a manner to be described below to raise or lower the transfer devices 80 at selected portions of the path of the transfer conveyor.

A carriage designated generally 98 is slidably mounted in each bracket 82 for horizontal sliding movement in a direction normal to the path of movement of the endless conveyor. A downwardly projecting roller 100 rotatably mounted on carriage 98 positions the carriage relative to bracket 82 in accordance with the engagement between roller 100 and cam tracks, such as 102, which are mounted upon the conveyor frame 50. Carriage 98 is formed with a pair of upwardly projecting bosses 104, 106, which are coaxially bored to slidably receive and support a guide shaft 108 which forms a part of a carrier assembly designated generally 110.

A thrust washer 112 fixedly mounted upon one end of shaft 108 limits movement of shaft 108 and carrier assembly 110 outwardly relative to carriage 98 by its engagement with the left-hand side of boss 104. A compression spring 114 engaged between the other side of boss 104 and a second thrust washer 116 on shaft 108 resiliently biases shaft 108 outwardly relative to carriage 98. When thrust washer 112 is engaged with boss 104, carrier 110 is said to be in its extended position relative to carriage 98, carrier 110 being shown at its inner end limit of movement, or retracted position, relative to carriage 98 in FIGS. 4 and 5.

Carrier 110 further includes a carrier block 118 which is mounted upon the outer end of shaft 108 by a downwardly projecting retainer block 120 which is fixedly secured to shaft 108 and block 118. The lower end of retainer block 120 projects downwardly below shaft 108 and is slidably received between a pair of projections 122 fixedly mounted upon bracket 82 to hold carrier assembly 110 against rotation about the axis of shaft 108, which is slidably received within bosses 104 and 106. A stop element 124 extends across and between the projections 122 on bracket 82 and defines the outward limit of movement of carrier assembly 110 relative to bracket 82, as shown in FIG. 6.

Carrier block 118 serves as the support for a support yoke element designated generally 126 and a retainer finger assembly designated generally 126 and a retainer finger assembly designated generally 128, yoke element 126 and retainer fingers 128 constituting the article supporting and retaining elements of the transfer device.

Figure 5:
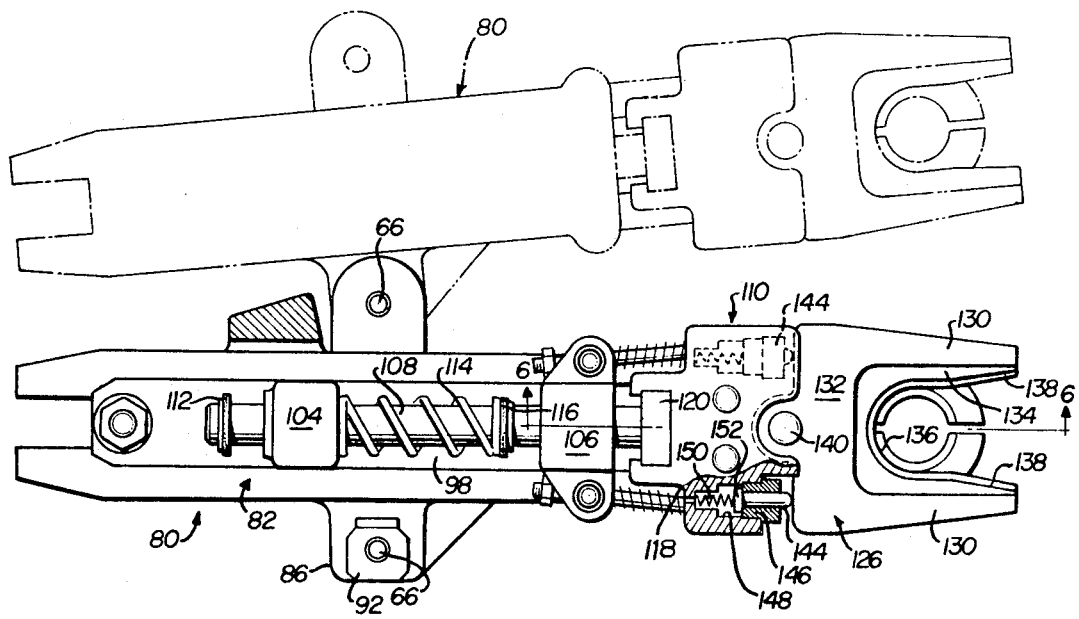
FIG. 5 is a plan view of a transfer device with certain parts broken away or shown in section.

As best seen in FIG. 5, yoke element 126 consists of a plate which is of generally U-shaped configuration in plan having a pair of outwardly projecting arms 130 which are integrally joined by a transversely extending base section 132. Either the arms 130 themselves, or preferably an insert 134 of some fibrous material, such as asbestos, define a recess having a semicircular inner wall at 136 and outwardly divergent sidewalls at 138, the entire inner periphery of the recess being bevelled at its upper edge to conform to the inclination of the bulged portion of the moil of the blank. The diameter of the semicircular portion of the recess is only slightly greater than that of the cylindrical portion of the moil and less than that of the outwardly bulged portion of the moil so that the article blank can be supported by yoke element 126 when the yoke is advanced into underlying relationship with the outwardly bulged upper portion of the blank moil.

Yoke 126 is moved into supporting relationship with blanks by advancing carriage 98 outwardly from the path of rods 66 (to the right as views in FIG. 5) as the entire transfer assembly is moving in parallel synchronized relationship with blanks on the ribbon conveyor.

The outwardly divergent edges 138 serve to guide the blank and yoke element 126 into operative relationship with each other in the event of a slight misalignment between the transfer device 80 and the blank suspended from ribbon machine 22. To further assist in compensating for such misalignment, yoke element 126 is pivotally mounted upon carrier block 118 by a picot pin 140. As best seen in FIG. 6, a forwardly projecting ledge 142 on carrier block 118 supports yoke element 126 from beneath and pivot pin 140 is mounted in this ledge. Pivotal movement of yoke element 126 about pin 140 is resiliently resisted by a pair of spring loaded pins 144 slidably mounted within bushings 146 received within bores 148 in carrier block 118 at opposite slides of the axis of pin 140. Pins 144 are resiliently biased outwardly by compression springs 150, a flange on the inner end of each pin at 152 limiting outward movement of the pin. Pivotal movement of yoke element 126 in either direction from the centered position shown in FIG. 5 will compress one of the other of centering springs 150 to accommodate alignment compensating movement of yoke element 126 during the initial engagement with the blank while the blank is still attached to the ribbon. When the blank is cracked off from the ribbon, the compressed centering spring returns yoke 126 to its original centered position.

Figure 7:
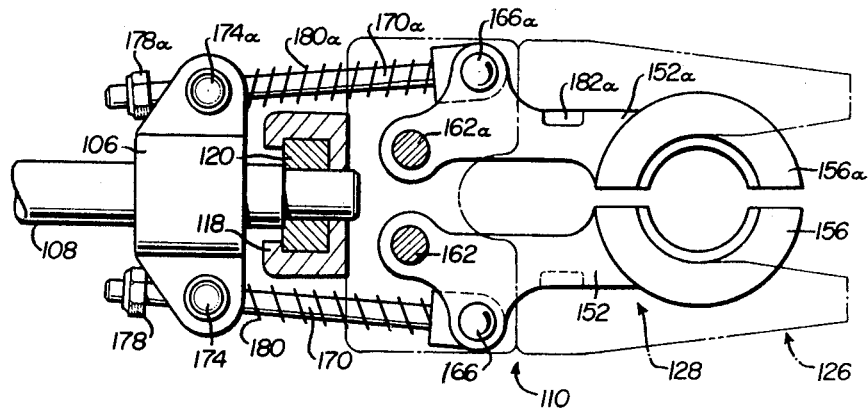
FIG. 7 is a detail cross-sectional view taken approximately on the line 7-7 of FIG. 4.

As best seen in FIGS. 6 and 7, retainer finger assembly 128 includes a pair of similar finger elements 152, 152a formed at their outer ends with complementary semicircular moil engaging jaws 156, 156a respectively. As in the case of support yoke 126, the moil engaging portions of the jaws may be lined with fibrous inserts such as 160.

Fingers 152 and 152a are pivotally mounted upon carrier block 118 by pivot pins 162, 162a respectively.

Because the structure and operating mechanism of each of fingers 152 and 152a, with one exception, are identical, only the structure and mechanism of finger 152 will be described in detail, the corresponding structure associated with finger 152a being identified by corresponding reference numerals with a subscript "a."

A second pivot pin 166 is mounted in a projecting arm 168 formed on finger 152 to pivotally connect finger 152 to the head of a swing bolt 170. The shaft of swing bolt 170 projects rearwardly from pivot 166 and is slidably received within a guide block 172 which is pivotally mounted as by a pin 174 in an outwardly projecting ear 176 integrally formed on boss 106 of carriage 98. Bolt 170 projects entirely through guide block 172 and a stop nut 178 is engageable with block 172 to establish a maximum spacing between pivot 174 on carriage 98 and pivot 166 on retainer finger 152, the finger in turn being pivotally connected to the carriage assembly 110 by pivot 162. A compression spring 180 is supported upon the shank of swing bolt 170 between guide block 172 and the head of the swing bolt.

In figures 5 and 6, the retainer fingers are shown in their closed position, in which the carrier assembly 110 is in its retracted relationship relative to carriage assembly 110 is in its retracted relationship relative to carriage 98. When the carriage and carrier assembly are in their retracted relationship relative to each other, spring 180 is compressed and the compressive force of this spring exerted between guide block 172 on carriage 98 is resiliently applied to the swing bolt to thus bias pivot 166 on retainer finger 152 in a counterclockwise direction about the pivotal axis of pivot pin 162. This action drives retainer finger 152 to the closed position shown in FIG. 6.

The one difference between the mechanisms associated with fingers 152 and 152a resides in springs 180 and 180a.

Spring 180a, which actuates finger 152a, is substantially stiffer than is spring 180, and in the finger closed position, firmly engages a lug 182a integrally formed on the finger 152a against the side of ledge 142 to establish the closed position of finger 152a. The closed position of finger 152 is established by its engagement with the moil portion of the supported article, hence spring 180 is a relatively weak spring. Fingers 152 and 152a are identical in structure and are mounted in the assembly one in inverted relationship to the other, thus the lug 182 on finger 152 projects downwardly and performs no function.

The manner in which the retainer fingers are moved between their opened and closed positions is best understood by reference to FIGS. 8 through 11 inclusive.

From the foregoing description, it is believed apparent that each transfer device may be said to consist of three subassemblies, namely the bracket 82, carrier 110 which in turn is slidably mounted upon carriage 98. Bracket 82 is mounted upon the vertical rods 66, and thus at all times is located at some position along the fixed path of the chain assembly of the transfer device so that it serves as a reference point from which movement of carriage 98 and carrier 110 relative to the fixed frame of the conveyor may be measured. As described above, carriage 98 is slidably positioned upon bracket 82 by the engagement between roller 100 and cam track 102 mounted upon the fixed frame. Carrier 110 is in turn slidably mounted upon carriage 98 and is spring biased normally to a position relative to carriage 98 at which thrust washer 112 engages boss 104 on carriage 98, the biasing action being provided by spring 114. Movement of carrier 110 relative to bracket 82 in a direction outwardly of the path of movement of transfer device 80 is limited by the engagement between block 120 on carrier 110 and stop element 124 mounted on bracket 82.

Because the article engaging elements—i.e. yoke 126 and retainer fingers 128 are mounted upon and carried by carrier 110, the position assumed by carrier 110 when block 120 is in engagement with stop element 124 represents the maximum extended position of carrier 110 relative to the endless path of movement of the transfer machine chains, and the carrier 110 is located in this maximum extended position when receiving bottles from ribbon machine 22 and also during the depositing of bottles on conveyor 42 of burnoff machine 24. With the carrier in its extended position, it is believed apparent that it is necessary to provide a mechanism by means of which the retainer fingers 128 can be disposed selectively in their opened or closed position while carrier 110 is at its maximum extended position to accommodate the capture and release of bottles from the transfer device. Opening and closing of the fingers is accomplished by relative movement between carriage 98 and carrier 110 accommodated by spring 114.

Figure 8:
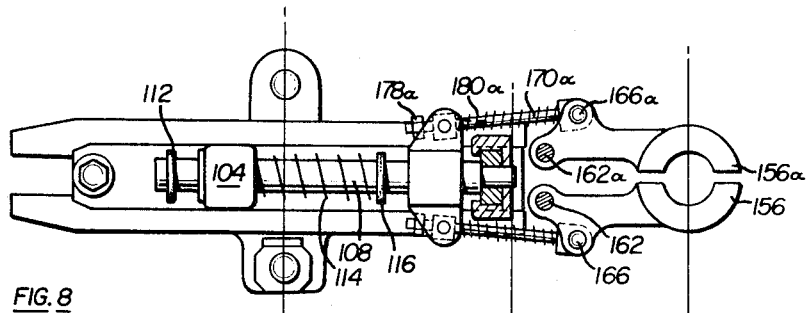
FIGS. 8, 9, 10 and 11 are detail plan views of the transfer device, partially in a cross-sectional view as in FIG. 7 showing successive steps in the actuation of the retainer finger mechanism.

Referring now to Fig. 8, the retainer finger assembly 128 is shown in its closed position, with block 120 in engagement with stop element 124 on bracket 82, and carriage 98 at its maximum right-hand limit of movement, to which it has been driven by the engagement between roller 100 and cam 102 on the conveyor frame. At this time, it will be noted that spring 114 is compressed, and that boss 104 is spaced to the right of thrust washer 112. Guide blocks 172, carried on carriage 98, are advanced forwardly along the shanks of swing bolts 170 clear of stop nuts 178, thus compressing the springs 180, 180a which, acting on the retainer fingers at pivots 156, 156a have biased the fingers inwardly about pivot 162 and 162a on carrier 110.

Figure 9:
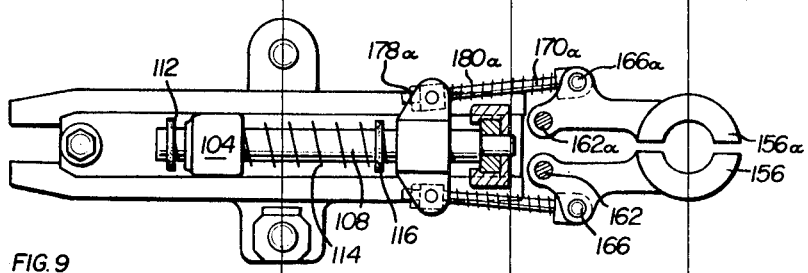

Referring now to Fig. 9, carriage 98 has begun to retract, moving to the left slightly from the Fig. 8 position, but has not yet moved far enough for boss 104 to engage thrust washer 112. Carrier 110 is still at its fully extended position, with block 120 in engagement with stop 124, the compressive force of spring 114 still being great enough to bias carrier 110 into engagement with its stop. Because pivots 162 and 162a are mounted upon carrier 110, they are still in the same position as in Fig. 8, although guide blocks 172, 172a which are supported on carriage 98, have slid rearwardly along the shanks of swing bolts 170, 170a so that the guide blocks are now just contacting their respective stop nuts 178, 178a. Springs 180 and 180a are still slightly compressed, and thus maintain the retainer fingers in their closed position, although the force holding the fingers in their closed position is reduced.

Figure 10:
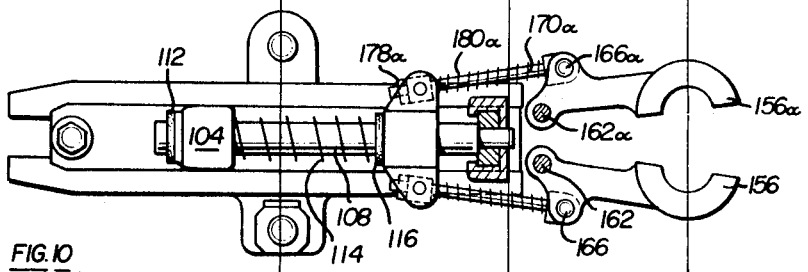

In Fig. 10, carriage 98 has been retracted still further to the left from its Fig. 9 position, with boss 104 on carriage 98 now engaged with thrust washer 112 so that the biasing force of spring 114 is no longer effective. Block 120 is still in engagement with stop element 124, but because the biasing action of spring 114 is now absorbed in the engagement between boss 104 and thrust washer 112, there is no biasing force urging the block 120 against stop 124. The relative movement between carriage 98 and carrier 110 between FIGS. 9 and 10 positions, as caused by 172a on carriage 98 to draw stop nuts 178, 178a to the left from the Fig. 9 position, this movement being transmitted via swing bolts 170, 170a to the respective fingers to swing the fingers outwardly to their open position about pivots 162, 162a which, because carrier 110 is still in the original Fig. 8 and Fig. 9 position, have as yet remained stationary.

Figure 11:
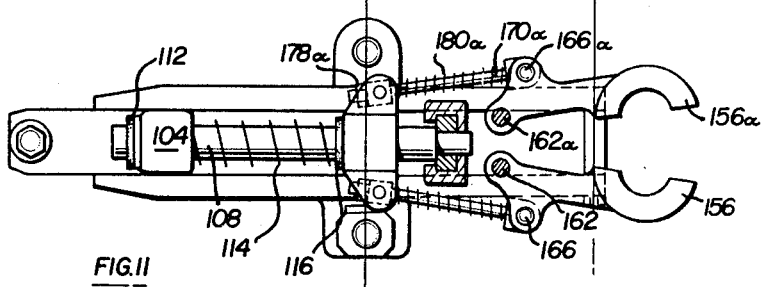

In Fig. 11, carriage 98 has been retracted further to the left from the Fig. 10 position, this retracting movement causing carrier 110 to move to the left with carriage 98, in view of the engagement between boss 104 and thrust washer 112. Thus, carrier 110 as a whole is being retracted from its extended position along with carriage 98.

From the foregoing description, the operative of bottle engaging subassembly of transfer device 80—i.e. carrier 100—is movable horizontally in a direction normal to the endless path of movement of the transfer device between an extended position in which the carrier 110 is in operative relationship with articles on either the ribbon or burnoff conveyor, and a retracted position in which carrier 110 is withdrawn clear of the path of movement of articles on either the ribbon or burnoff conveyor. The actuating mechanism—i.e. carriage 98— has three critical positions relative to the path of movement of transfer device 80. For convenience, these may be referred to as a retracted position corresponding to the inward limit of movement of carriage 98 relative to the path of movement of transfer device 80, an intermediate position, corresponding to that of Fig. 10, at which carrier 110 is in its extended position with thrust washer 112 still in engagement with boss 104 on the carriage, and an overtravel position corresponding to that of Fig. 8, representing the outermost limit of movement of carriage 98 relative to the path of movement of transfer device 80.

Figure 12:
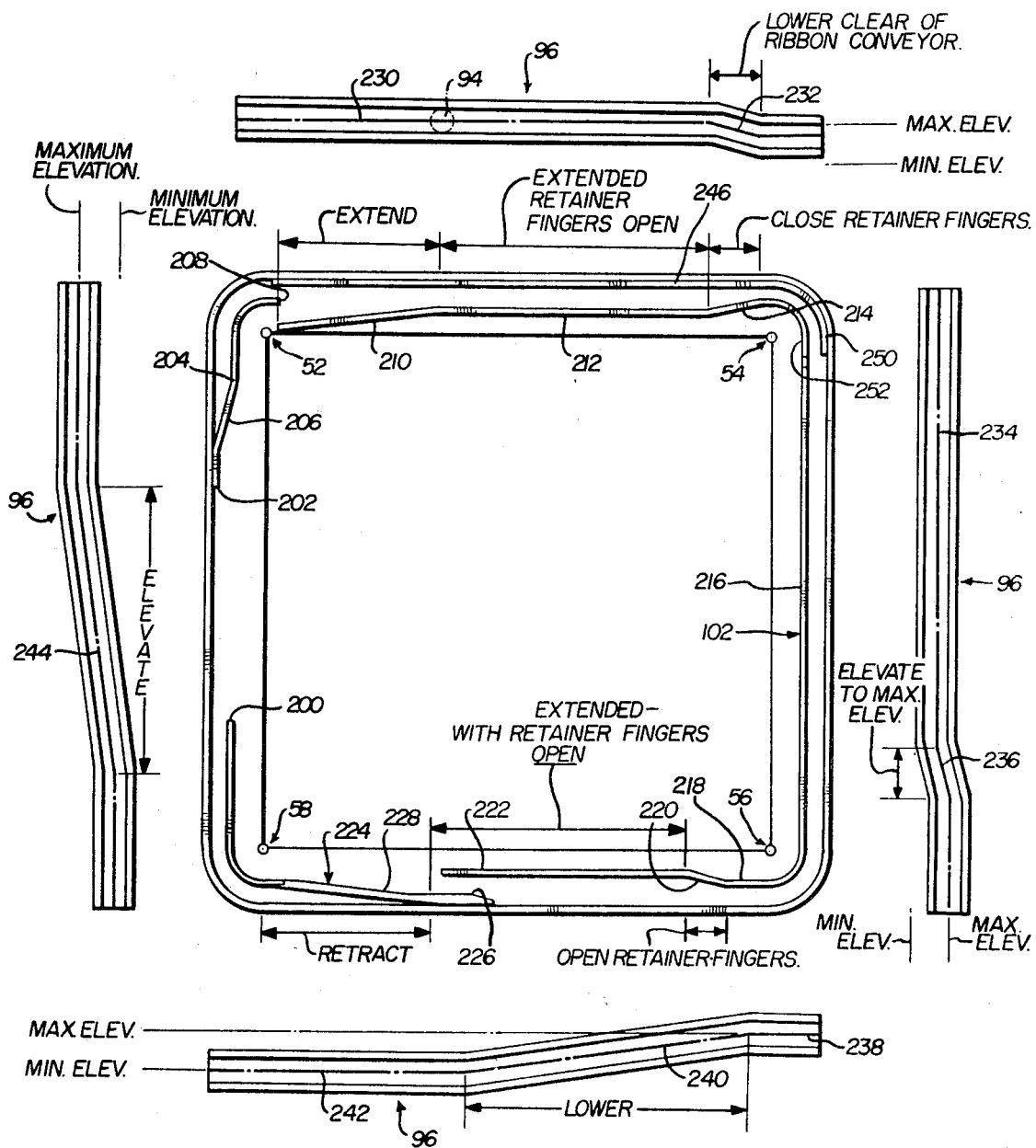
FIG. 12 is a schematic diagram showing the configuration of the cam assemblies employed to actuate the transfer device.

The configuration of cam track 102 for positioning is shown schematically in Fig. 12.

In Fig. 12, the shafts of the various guide wheel assemblies 52, 54, 56 and 58 have been indicated to orient the path, it being recalled that ribbon conveyor 22 passes along that side of the path extending from guide wheel assembly 52 to guide wheel assembly 54, while the burnoff conveyor 42 passes along that portion of the path extending between guide wheels 56 and 58. The path of movement of the individual transfer devices is in a clockwise direction as viewed in Fig. 12. The reference numeral 102 is employed in a general manner to designate the entire cam assembly engaged with rollers 100 to position the respective carriages 98, as indicated in Fig. 12, the cam assembly designated generally 102 consists of several separate and distinct cam sections.

Along that portion of the path extending from guide wheel 58 to guide wheel 52, the cam assembly 102 is interrupted between points 200 and 202 to provide a section at which individual transfer devices may be assembled into or disassembled from the endless chain. This particular run of the path is merely a return run, and the horizontal position of carriages 98 relative to the chain path along this particular run is of no consequence in the region between points 200 and 202.

As the transfer devices are carried around the corner at guide wheel assembly 52, they begin to move into operative relationship with bottles suspended from ribbon conveyor 22, and it is necessary that at the beginning of the passage of transfer devices 80 along that portion of the path between guide wheel assemblies 52 and 54, that the carriages 98, and hence their associated carriers 110 be in their fully retracted position. Because no positive guidance of the position of the carriages 98 upon their respective brackets has been provided between points 200 and 202, a cam section 204 is mounted on the conveyor frame to engage the carriage positioning rollers 100 on the side outwardly from their axis of rotation to draw the rollers inwardly with respect to their path of movement to the fully retracted or withdrawn position of carriage 98. Because the position of the individual rollers 100 inwardly or outwardly of the path of movement is indeterminent as the rollers approach point 102, the upstream end of cam section 204, at point 202 is positioned outwardly above the path of movement at a location such that a roller 100 of a carriage 98 which was at its maximum extended position would still pass on the inner side of cam section 204. An inwardly inclined portion 206 of cam section 20 forces rollers 100 passing along this section inwardly of the conveyor path to positively draw the attached carriages 98 to their fully retracted or withdrawn position as the transfer devices 80 pass around the corner at guide wheel assembly 52.

The portion of cam assembly 102 which extends from guide wheel assembly 52 to and around the corner at guide wheel assembly 54 is mounted upon conveyor frame 50 for movement between a normal operating position and a retracted nontransfer position. The purpose of this arrangement and structural details will be described below. During normal operation, this movable cam section is in the position shown in Fig. 12 and only that portion associated with normal operation of the machine will be described at this point.

As the rollers 100 of the respective transfer devices 80 pass around the corner at guide wheel assembly 52, the rollers, which are travelling along the inside of cam section 204 are carried beyond the end 208 of section 204. Movement of the individual transfer devices 80 along their respective paths is synchronized with that of movement of bottles on ribbon conveyor 22 so that the yoke 130 of each transfer device 80 is operatively aligned with a bottle throughout the movement of the particular yoke between guide wheel assemblies 52 and 54. As the transfer device 80 comes around the corner at guide wheel assembly 52, cam section 204 has positioned the carriage in its fully retracted position, hence as the transfer device 80 passes beyond end 208, its yoke is in a retracted position clear to one side of the bottles on ribbon conveyor 22. During movement between guide wheel assemblies 52 and 54, it is thus necessary to move the yoke to its extended position in operative alignment with the bottle. To accomplish this, an outwardly inclined section 210 on cam assembly 102 is located to engage the inner side of rollers 100 as the rollers pass beyond the end 208 of cam section 204 to force the rollers and their attached carriages outwardly as the transfer device is conveyed toward guide wheel assembly 54.

From the description above relative to the operation of retainer fingers 120, the retainer fingers must be open as the yoke is advanced into underlying relationship with the upper moil portion of the bottle. Hence, inclined section 210 merges into a straight section 212 of cam 102 which engages rollers 100 to advance the carriage 98 outwardly to the position of Fig. 10, at which time the yoke is operatively aligned with the path of movement of the bottle on ribbon conveyor 22, while the fingers 128 are still in their opened position.

As the transfer device approaches guide wheel assembly 54, a second outwardly inclined cam section 214 engages the rollers 100 to force the carriages 98 outwardly to drive the fingers 128 to their closed position before the bottle passes around the corner at guide wheel assembly 54.

Rollers 100 travel along the outer side of a cam section 216 extending from guide wheel assembly 54 to guide wheel assembly 56 to maintain the associated carriages in their fully extended position during transit of this portion of the conveyor path. The carriages are maintained in their fully extended or overtravel position as the devices pass around the corner at guide wheel assembly 56 and a section 218 of cam 102 which extends partially along the first portion of the path between guide wheel assemblies 56 and 58 maintains the carriages in their fully extended or overtravel position. It is during this portion of the path that the bottles are deposited upon the burnoff conveyor. Cam section 218 merges into an inwardly inclined cam section 220 which permits carriage 98 to be moved inwardly by the biasing action of spring 114, until thrust washer 112 engages boss 104 on the carriage. This particular movement is that movement which occurs between the Fig. 8 and Fig. 10 positions of the retainer finger assembly, and is employed to open the retainer fingers, without withdrawing the yoke from operative relationship with the bottle. The roller 100 is engaged with the outer side of cam section 220 which merges into a straight transition section which overlaps a retracting cam section designated generally 224. The upstream end of section 224 is inclined inwardly as at 226 to provide a positive means for retracting the carriages. The spacing between section 226 and 222 is slightly greater than the roller diameter, the biasing force of spring 114 maintaining the roller 100 in engagement with the outer side of section 222 under normal operating conditions. As the roller passes beyond the left-hand end of section 222, it moves into engagement with an inwardly inclined section 228 on cam 224 which engages the outer side of rollers 100 to draw the rollers inwardly, thereby retracting the carriages and carriers clear of the path of movement of bottles on the burnoff conveyor as the transfer devices approach the corner at guide wheel assembly 54.

The configuration of cam track 96, which cooperates with roller 94 on bracket 82 to control the elevation of transfer devices 80 in accordance with their position on the path is also schematically illustrated in Fig. 12.

That portion of cam track 96 which extends along the run of the conveyor between guide wheels 52 and 54 includes a flat section 230 which extends from guide wheel 52 to a point adjacent guide wheel 54, at which cam track 96 is formed with a downwardly inclined section 232. The downwardly inclined section 232 may be substantially coextensive with inclined portion 214 of the carriage positioning track so that, as the retainer fingers are driven to their closed position by the engagement between section 214 and carriage positioning roller 100, the entire transfer device is lowered slightly as its vertically positioning roller 94 rolls down inclined section 232. However, closing of the retainer fingers may be accomplished before, during, or after the lowering of the transfer device by appropriately locating cam section 214. Closing of the fingers may be accomplished as desired at any time after crackoff and before transit of guide wheel 54. This action takes place after the bottle is cracked off from the ribbon conveyor and lowers the cracked-off bottle slightly below the ribbon conveyor to assure clearance as the captured bottle is moved away from its path on the ribbon conveyor around the corner at guide wheel 54.

As the transfer device progresses along that portion of the path between guide wheels 54 and 56 it passes along a level section 234 of cam track 296 at the same level to which the assembly was lowered by downwardly inclined section 232. At some point prior to the arrival of the transfer device 80 at guide wheel 56, an upwardly inclined section 236 engages the vertical positioning roller 94 of the transfer device to again elevate the transfer device to its maximum elevation.

As the transfer device passes around the corner at guide wheel 56, it is maintained at its maximum elevation as it passes along a relatively short section 238 of cam track 96, from which the vertical positioning roller 94 of the transfer device passes on to a downwardly inclined lowering section 240. Section 240 is a transition section from which the device passes at its maximum elevation at section 238 to a minimum elevation at a section 242 extending from the lower end of transition section 240. The lowering of the transfer device along section 240 lowers the bottle onto the bottle receiving support of burnoff conveyor 42. It will be noted that the retainer fingers are opened, at section 220 of cam track 96, before vertical positioning roller 94 of the transfer device reaches the lower end of transition section 240. The retainer fingers are opened when the bottle becomes seated upon its support on burnoff conveyor 42, further lowering movement of the transfer device 80 lowering the supporting yoke 126 clear of the outwardly bulged upper portion of the moil as the retainer fingers are opened. The transfer device is maintained at its minimum elevation as its roller 94 passes along section 242 of cam track 96, during which time the carrier 110 and carriage 98 are retracted inwardly by the passage of the device along section 228 of cam track 96.

The transfer device 80 passes around the corner at guide wheel 58 and, during its movement between guide wheels 58 and 52, passes along an upwardly inclined section 244 which raises the transfer device from its minimum elevation to its maximum elevation as the device 80 approaches guide wheel 52.

Because of the fact that both vertical positioning roller 94 and the horizontal positioning roller 100 of each transfer assembly 80 are not vertically movable relative to each other, it is believed apparent that the horizontal positioning cam track 102 is provided with vertically inclined sections corresponding to those on the vertical positioning track 96. Reference may be had, for example, to Fig. 3 wherein at the right-hand side of the figure, a transfer device 80 is shown at its maximum elevation at a point in time where the transfer device is just passing on to sections 214 of cam 102 and section 232 of cam 96. At the left-hand side of Fig. 3, the transfer device 80 is shown at its minimum elevation, the device being located near the bottom of inwardly inclined section 240 of cam track 96 with the roller 100 being in the overlapped region of sections 222 and 224 of cam track 102.

Because the vertical positioning cam 96 operates on roller 94 which is mounted on bracket 82, cam 96 in plan view is in fixed parallel relationship to the endless path of movement of the rods 66.

Figure 13:
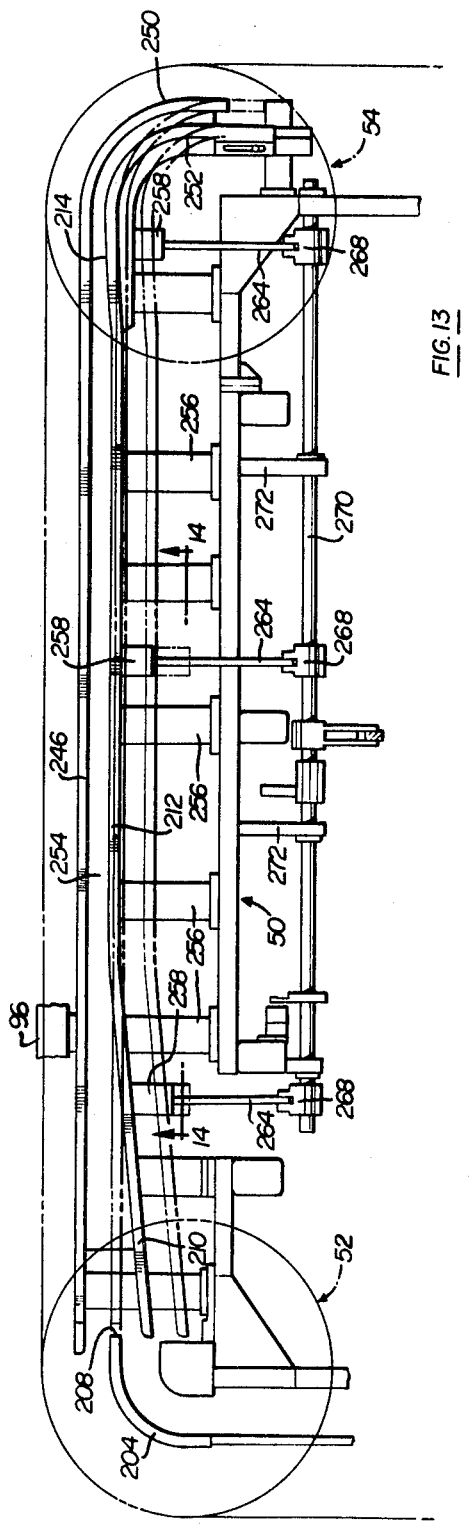
FIG. 13 is a detail plan view, partially in section, showing the structure of the retractable cam assembly.
Figure 14:
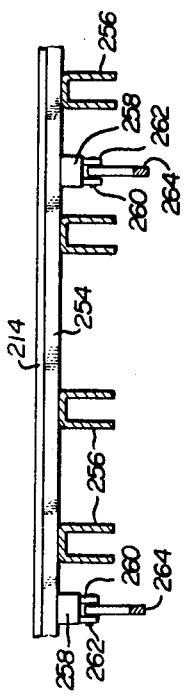
FIG. 14 is a detail cross-sectional view taken approximately on line 14-14 of FIG. 13.

As explained above, that section of the horizontal positioning cam track 102 which extends between guide wheels 52 and 54 is mounted for movement relative to the conveyor frame so that it can be positioned in the normal operative position illustrated in Fig. 12 or in an inwardly retracted position to prevent the transfer devices from moving into operative relationship with bottles on ribbon conveyor 22. Referring to Fig. 13, it is seen that a second cam track 246 extends along the side of the path between guide wheels 52 and 54, the track 246 being spaced outwardly from the track sections 210, 212 and 214 and merging into a curved portion 250 which extends around the corner at guide wheel assembly 54 in a path concentric but radially outwardly from the corresponding curved section 252 which extends from the inner inclined section 214 around the corner at guide wheel 54.

Referring now particularly to FIGS. 3 and 13 through 15 inclusive, there is disclosed in these figures details of the mechanism referred to above by means of which that portion of cam assembly 102 extending between guide wheel assemblies 52 and 54 may be moved between a normal operating position and a retracted position. The two cam sections 210—212—214 and 246 are mounted upon an elongate plate 254 which is slidably supported for horizontal movement upon a plurality of channel shaped frame members 256 fixedly mounted upon conveyor frame 50. At spaced locations along plate 254, rearwardly projecting strap elements 258 are fixedly secured to the underside of plate 254 and support, at their inner or rearward ends, a pair of depending ears 260 within which are supported horizontally extending pivot pins 262.

Pins 262 pivotally interconnect the straps 258 to the forward ends of actuating links 264 which in turn are pivotally connected at their rearward ends, as by pivots 266, to an associated crank 268 fixedly mounted upon a shaft 270 rotatably mounted in the conveyor frame as by support arms 272. An actuating crank 274 is likewise rotatively fixed to shaft 270 and is pivotally coupled as at 276 to the piston rod 278 of a pneumatic motor 280. Motor 280 is in turn pivotally mounted upon conveyor frame 50 as at 282.

In FIGS. 3 and 13, the assembly is shown in its normal operating position with cam section 210, 212, 214 in its normal operating position in which it is operable to engage and position the rollers 100 of the transfer devices 80. When in this position, as shown in Fig. 3, piston rod 278 of pneumatic motor 280 is in its fully retracted position.

Motor 280 is controlled from a suitable pressure source by a conventional four-way reversing valve in the usual manner. Because the pneumatic control connections to motor 280 are completely conventional, they have not been illustrated.

The assembly upon which cams 210, 212, 214 and 246 are mounted is movable, upon the extension of the piston rod 278 of motor 280, from the full line position illustrated in Fig. 13 to the broken line position, at which cam 246 defines a straight continuous extension of the outlet end of cam section 204. From the previous description of Fig. 12, it will be recalled that the outlet end 208 of cam 204 is positioned so that the rollers 100 of transfer devices 80 are in their fully retracted or withdrawn position as the rollers pass from end 208 of cam 204, hence when cam section 246 is in the broken line position of Fig. 13, the rollers 100 will be maintained in their fully retracted position throughout their passage along the run of the conveyor between guide wheel assemblies 52 and 54.

The purpose of so maintaining rollers 100 in their retracted position is to maintain the article engaging elements 126 and 128 of the transfer devices 80 in a position completely withdrawn from and clear of the path of movement of articles suspended from ribbon conveyor 32. It is desired to do this when the ribbon machine is initially started up, because a substantial period of time is required for the glass contacting parts of the ribbon machine and blow mold mechanism to become heated to their normal operating temperatures. Until normal operating temperatures are achieved, the molded articles are not formed satisfactorily, and there is no sense in transferring the malformed articles from the ribbon conveyor, since they will ultimately be rejected. Therefore, during the warmup period, cam 246 is positioned, by the mechanism described above, in the broken line position of Fig. 13 so that the transfer machine, although being driven, is inoperable to remove bottles from the ribbon machine conveyor, the bottles being severed from the ribbon by the device 40 and collected as cullet.

Figure 15:
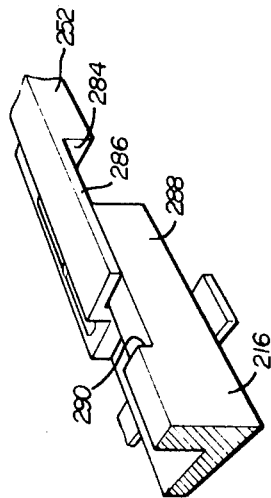
FIG. 15 is a detail perspective view of one end of the retractable cam assembly.

Previously described, cams 210—212—214 and 246 are extended, by sections 250 and 252 respectively around the corner at guide wheel assembly 54. In order to accommodate the range of movement required of the assembly between the full and broken line positions of Fig. 13, the cam section 252 is formed to overlap the adjacent end of the fixed cam section 216 extending from guide wheel assembly 54 to guide wheel assembly 56, as best seen in Fig. 15. The lower portion of the outlet end of cam section 252 is recessed as at 284, to define an operating extension 286 which overlies a corresponding extended portion 288 on cam 216, a recess 290 complementary to extension 286 being formed in cam section 216. With the cam assembly in its normal operating position, the two extensions 286 and 288 are slightly overlapped as indicated in Fig. 15, the upper portion of the rollers 100 engaging the side of extension 286, while the lower portion of the roller engages the side of extension 288. When the cam assembly is in the retracted position illustrated in broken line in Fig. 13, the two extensions are completely overlapped.

OPERATION

It is believed that the operation of the apparatus described above can be most clearly visualized by following the progress of a single bottle through the apparatus. It will be appreciated, of course, that the movement of the individual transfer devices along their path of movement of the transfer machine is accurately synchronized with both the movement of the articles on the ribbon conveyor and the movement of the bottle receiving chucks on burnoff conveyor 42.

The formation of the bottles on the ribbon machine has been described briefly above and further details of this particular forming process are set forth in U.S. Pat. No. 1,790,397. From the preceding description, it will be recalled that as the formed bottle moves away from the blow mold apparatus 36, the bottle and its moil portion are suspended beneath the plates 32 of the ribbon conveyor and are integrally connected through an orifice in the plates 32 to the glass ribbon R lying on top of the plates, as best seen in Fig. 2. As the suspended bottle is carried by ribbon conveyor 32 past guide wheel assembly 52 of the transfer conveyor, a transfer device 80 rounds the corner at guide wheel assembly 52 and begins to move along the run of the transfer device toward guide wheel assembly 54 in aligned side-by-side relationship with the bottle moving along ribbon conveyor 32.

Referring now to Fig. 12, it will be recalled that the transfer device 80 is in its fully retracted or withdrawn position as it rounds the corner at guide wheel assembly 52 by virtue of the engagement between the roller 100 on its carriage 98 with the inner side of track section 204 (FIG. 12). From FIG. 11, it will be recalled that when carriage 98 is in its fully retracted position, the retainer fingers 152 and 152a are open and, with the transfer device 80 in its fully retracted position, yoke 126 of the transfer device is withdrawn clear of the path of articles moving along ribbon conveyor 32.

Referring to Fig. 12, as the roller 100 of the transfer device passes beyond the end 208 of cam section 204, the roller moves into engagement with the outermost side of the inclined track section 210 which begins to drive carriage 98 outwardly as the transfer device 80 moves to the right along track section 210.

From the schematic diagrams of the raising and lowering cam track 96 of FIG. 12, it is noted that as the transfer device passes around the corner at sprocket assembly 52, section 230 of the elevating cam track 96 receives the elevating roller 94 of the transfer device to maintain the transfer device at its maximum elevation, the device being shown at this elevation at the right-hand portion of FIG. 3.

With the transfer device moving along section 210 (FIG. 12) in synchronism with the movement of the bottle along the ribbon conveyor, cam section 210 projects the carriage outwardly, and the arms 130 of yoke 126 pass on opposite sides of the moil portion of the bottle into underlying relationship with the outwardly inclined upper portion 39 (FIG. 2).

The maximum elevation of the transfer device is chosen such that as the yoke 126 moves outwardly into underlying relationship with the bulged portion 38 of the moil, the yoke is spaced slightly below and out of contact with portion 38 of the moil while the bottle remains attached to the ribbon R. This relationship is indicated in FIG. 2.

From the description of the mechanism for opening and closing fingers 152 and 152a, it will be recalled that the fingers remain open until after block 120 on carrier 110 has contacted stop element 124 on bracket 82 of the transfer device (FIG. 6). The engagement between elements 120 and 124 as shown in FIG. 6 accurately align carrier 110 and its operative elements (yoke 126 and retainer finger assembly 128) with the path of movement of the bottle along ribbon conveyor 32.

Elements 120 and 124 move into contact with each other as the roller 100 of the transfer device passes from inclined cam track section 210 (FIG. 12) onto straight section 212. The relative positions of the bracket, carriage and retainer fingers during the transit of cam section 212 is that illustrated in Fig. 10—i.e. yoke 110 is in its operative vertical alignment with the bottle on the ribbon conveyor, while retainer fingers 152 and 152a are in their open position, as is required to clear the bottle during movement of the yoke into its operative alignment with the bottle path.

As the transfer device 80 passes along section 212, the crackoff device 40 operates to separate the bottle from the ribbon by cracking off the bottle at the top of its moil portion approximately along the crackoff line indicated in FIG. 2. When the bottle is cracked off, it drops downwardly into supported relationship upon yoke 126 prior to the time at which the transfer device 80 passes from the right-hand end of cam section 212 (FIG. 12) onto the outwardly inclined section 214.

As the roller 100 of the transfer device 80 passes from cam section 212 onto cam section 214, the inclined cam section 214 drives roller 100 outwardly, thereby shifting carriage 98 of the transfer device from the position shown in Fig. 10 to the position shown in Fig. 8, thereby closing the retainer fingers 152 and 152a so that the fingers closely surround the cylindrical portion of the moil.

The closed retainer fingers serve two functions: first, the bottle is maintained against swinging movement upon its support seat provided by yoke 126, and second, the bottle is prevented from being thrown off the yoke by centrifugal force as the assembly passes around the corners of the transfer machine at guide wheel assemblies 54 and 56.

From Fig. 12, it will be noted that as the transfer device passes along cam section 214 to close the retainer fingers, the elevating cam track assembly 96 also has a downwardly inclined section 232 so that as the retainer fingers close around the cylindrical portion of the moil, the supported bottle is also lowered downwardly away from the ribbon conveyor to assure clearance as the path of the ribbon conveyor and the transfer machine diverge as the transfer device passes around the corner at guide wheel assembly 54.

The transfer device remains in the same condition—i.e. fully extended with the retainer fingers closed—as if traverses cam section 216 toward guide wheel assembly 56. As the transfer device approaches guide wheel assembly 56, elevating cam track 96 is provided with an upwardly inclined section 236 to raise the transfer device to its maximum possible elevation as the device approaches the corner at guide wheel assembly 56.

The transfer device and its suspended bottle pass around the corner at guide wheel assembly 56 and move into overlying relationship with the bottle receiving devices on burnoff conveyor 42 with the suspended bottle located and maintained in vertical alignment with a bottle-receiving seat on the burnoff conveyor. Shortly after the transfer device has moved around the corner at guide wheel assembly 56, the elevating cam track 96 has a downwardly inclined lowering section 240 which, as the suspended bottle and burnoff conveyor move in synchronism causes the transfer device to lower downwardly to move the bottle into seated engagement with the receiving device on burnoff conveyor 42.

Referring to FIG. 12, as the transfer device is being lowered along elevating cam section 240, a cam section 218 engages the roller 100 to maintain the transfer device in its fully extended position. Before the transfer device is lowered to its minimum elevation, its roller 100 passes onto an inwardly inclined section 220 which permits the spring 114, compressed between carriage 98 and carrier 110, to move the carriage back or inwardly from the position of FIG. 8 to that of FIG. 10, thereby opening the retainer fingers as the bottle is placed upon burnoff conveyor 42. As the roller 100 passes from inclined section 220 onto straight section 222, the carriage is maintained at the intermediate extended position of FIG. 10 while the transfer device traverses this portion of its path. It is during this portion of the path that the clamping devices on the burnoff conveyor move into operative engagement with the bottle.

It will be noted from FIG. 12 that the downwardly inclined section of the elevating cam 96 terminates when the transfer device is approximately one-half of the way along cam section 222. When the transfer device is at its minimum elevation, at the lower end of cam section 240, its yoke 126 is spaced slightly below the inclined section 38 of the moil of the bottle, which is now supported and gripped upon burnoff conveyor 42. This is to assure that the yoke 126 is disengaged from the bottle prior to its withdrawal.

Further movement of the transfer device beyond the left-hand end of cam section 222 carries its roller 100 into engagement with the inner side of inwardly inclined cam section 228 to withdraw the transfer device clear of the path of movement of articles along burnoff conveyor 42 as the transfer device approaches sprocket assembly 58. At the left-hand end of inclined section 228, the parts of the transfer device are in their fully withdrawn position—i.e. that of FIG. 11, and clear of the path of articles on the burnoff conveyor.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. Apparatus for transferring glass article blanks each having an outwardly bulged moil portion at its upper end from a first conveyor to a second conveyor, said apparatus comprising endless conveying means including a stationary frame and an endless chain assembly mounted upon said frame for movement along an endless path having a first run extending parallel to the path of movement of blanks on said first conveyor and a second run extending parallel to the path of movement of blanks on said second conveyor, a plurality of transfer devices mounted upon said chain assembly for movement therewith and for movement relative thereto in both vertical and horizontal directions normal to the path of movement of said chain assembly, horizontally extending support finger means on each of said transfer devices adapted to be engaged beneath the bulged moil portion of a blank at the front and rear sides thereof with respect to the direction of movement of the blank on said first conveyor to suspend and support the blank for movement along said endless path, and retainer finger means on said transfer device beneath said support fingers selectively actuable to an open blank receiving or releasing position or to a closed position wherein said finger means surround the moil portion of a blank supported on said support finger means to retain said blank against horizontal movement relative to said support finger means.

2. Apparatus as defined in claim 1 wherein each of said transfer devices comprises a bracket mounted upon said endless chain assembly for movement therewith, a carriage slidably mounted upon said bracket for movement relative to the bracket in a horizontal path normal to the path of movement of said chain assembly between an inner withdrawn position and an outwardly projected extended position with respect to the endless chain path, cam means on said stationary frame engageable with said carriage for locating said carriage at selected positions on its horizontal path relative to said bracket in accordance with the position of said bracket on the path of said endless chain assembly, and carrier means mounting said support finger means and said retainer finger means upon said carriage.

3. Apparatus as defined in claim 2 further comprising means supporting said carrier means for sliding movement upon said carriage in a direction parallel to the direction of movement of said carriage upon said bracket, means defining opposite end limits of said carrier relative to said carriage, spring means biasing said carrier to one of said end limits of movement relative to said carriage, retainer finger actuating means coupled to said carriage and operable to locate said finger means in its opened position when said carrier is at said one end limit of movement relative to said carriage and operable to shift said retainer finger means to their closed position when said carrier is moved to its other end limit of movement relative to said carriage, and stop means on said bracket engageable with said carrier when said carriage is at a position intermediate its withdrawn and extended position relative to said bracket to hold said carrier against further outward movement relative to said bracket as said carriage is moved outwardly from said intermediate position to its projected position, movement of said carriage from said intermediate position to said projected position shifting said carrier from said one end limit to its other end limit of movement relative to said carriage.

4. Apparatus as defined in claim 3 wherein said carriage during movement along said first run of the endless path of said chain assembly is successively engaged with a first, a second, and a third section of said cam means, said first section of said cam means being operable to shift said carriage from its withdrawn position relative to said bracket to its intermediate position, said second section of said cam means being operable to maintain said carriage in its intermediate position, and said third section of said cam means being operable to move said carriage from its intermediate position to its extended position, said carrier member being moved by said carriage upon movement of said carriage from its withdrawn to its intermediate position to shift said support finger means from a position clear of the path of movement of articles on said first conveyor into an article receiving alignment with an article on said first conveyor, and means operable while said carriage is engaged with said second section of said cam means for releasing the article from said first conveyor to transfer the support of the article from said first conveyor to said support finger means.

5. Apparatus as defined in claim 2 further comprising elevating roller means mounted on said bracket, and track means mounted upon said stationary frame in supporting engagement with said roller for positioning said bracket vertically relative to said stationary frame in accordance with the position of the bracket along the path of said endless chain assembly.

6. Apparatus as defined in claim 5 wherein articles on said first conveyor are suspended from said first conveyor, means on said second conveyor for supporting said articles from beneath, said track means having a downwardly inclined section extending along said second run to lower said bracket from a maximum elevation to a minimum elevation as said bracket passes along said second run, said bracket when at its minimum elevation supporting said support fingers below and out of contact with the bulged moil portion of an article supported on said second conveyor.

7. For use in combination with a glass-forming machine of the ribbon type wherein glass articles are formed at uniformly spaced intervals on a glass ribbon driven along a straight line path, the articles being integrally suspended from the ribbon by an outwardly bulged moil portion, and wherein the moil portion of the articles are severed at their upper ends from the ribbon as the ribbon is advanced past a severing station; transfer means for receiving severed articles from said forming machine and conveying the severed articles to a discharge location, said transfer means comprising conveying means having an endless chain assembly mounted upon a frame for movement along an endless path having a receiving run extending parallel to the path of movement of the glass ribbon with said severing station being located at a point intermediate the ends of said receiving runs, a plurality of transfer devices mounted upon said chain assembly at uniformly spaced intervals corresponding to the spacing of said articles upon said ribbon, article engaging support finger means mounted on each of said transfer devices for movement relative to said chain assembly vertically and horizontally in a direction normal to the path of movement of said chain assembly, means for driving said chain assembly in synchronism with the movement of articles on said ribbon to drive said transfer devices along said receiving run in aligned side-by-side relationship with articles on said ribbon, cam means on said frame extending along said receiving run for shifting each of said support finger means outwardly into underlying relationship to the bulged moil portion of an article on said ribbon before the article reaches said severing means, and article retaining finger means on each of said transfer devices actuable by said cam means after the article has been severed from said ribbon to retain the article against horizontal movement on said support finger means.

8. The invention defined in claim 7 further comprising track means on said frame extending along said receiving run for maintaining said support finger means at a maximum elevation until said support finger means has been moved along said run beyond said severing station, said support finger means when at said maximum elevation being spaced in vertical alignment beneath the bulged moil portion of the article on said ribbon, and a downwardly inclined section on said track means for lowering said support finger means with the severed article supported thereon downwardly away from said ribbon after the support finger means has moved beyond said severing station.

9. The invention defined in claim 7 further comprising means supporting said cam means on said frame for movement between a normal position wherein said cam means is operable to shift said support finger means into said underlying relationship and a second position relative to said frame, means for selectively locating said cam means in either of said first or said second positions, and means on said cam means operable when said cam means is in said second position for maintaining said support finger means in an inwardly withdrawn position clear of the path of movement of articles on said ribbon throughout the passage of the support finger means along said receiving run.

10. Apparatus as defined in claim 7 wherein said support finger means comprises a yoke element having spaced horizontally outwardly projecting fingers connected at their inner ends by a base portion, said fingers adjacent said base portion being spaced from each other to receive the moil portion of the article therebetween in underlying supporting relationship to the bulged portion of the moil, said fingers diverging from each other adjacent their outer ends.

11. The invention as defined in claim 10 further comprising means supporting said yoke element upon the transfer device for pivotal movement about a vertical axis, and spring means resiliently resisting pivotal movement of said yoke element about said axis in either direction from a normally maintained centered position relative to the transfer device.

12. Apparatus as defined in claim 10 wherein said retainer finger means comprises a pair of retainer fingers mounted upon the transfer device for pivotal movement in a horizontal plane between an opened and a closed position, said retainer fingers in said open position being spaced from each other by a distance sufficient to clear the moil portion of said blank and having cooperating retaining sections at their respective outer ends conformed to closely surround the moil portion of a blank supported on said yoke element when said retainer fingers are in their closed position and means operable by said cam means when said yoke element is located in underlying supporting relationship to the bulged portion of the moil on an article for selectively locating said retainer fingers in their open or closed position.

13. For use in an article transfer apparatus; a transfer device comprising a bracket, a carriage mounted upon said bracket for sliding movement relative thereto along a horizontal path between spaced inner and outer end limits, a carrier mounted upon said carriage for movement relative to said carriage in directions parallel to said horizontal path between an inner retracted position and an outer extended position relative to said carriage, said carrier projecting outwardly beyond the outer end of said carriage, spring means engaged between said carriage and said carrier biasing said carrier toward said extended position relative to said carriage, an outwardly opening support yoke mounted upon said carrier and adapted to support an article to be transferred, a pair of retainer fingers pivotally mounted upon said carrier beneath said yoke for movement between an open article receiving position and a closed article retaining position wherein said retainer finers are operable to retain an article supported upon said yoke against outward movement relative to said yoke, retainer finger actuating means coupled between said retainer fingers and said carriage for locating said fingers in their open position when said carrier is in its extended position relative to said carriage and operable to move said fingers to their closed position upon movement of said carrier from its extended position to its retracted position relative to said carriage, and stop means on said bracket engageable with said carrier when said carriage has moved a selected distance from its inner end limit toward its out end limit to hold said carrier against further outward movement relative to said bracket whereby further outward movement of said carriage to its outer end limit moves said carrier against said spring means to its retracted position relative to said carriage.

PO-1050
(5/69)

UNITED STATES PATENT OFFICE
CERTIFICATE OF CORRECTION

Patent No. 3,590,982          Dated July 6, 1971

Inventor(s) John D. Banyas

It is certified that error appears in the above-identified patent and that said Letters Patent are hereby corrected as shown below:

Col. 4, line 64 "roller" should be --rollers--
Col. 5, lines 58-59 delete "and a retainer finger assembly designated generally 126"
Col. 6, line 27 "of" (first occurrence) should be --or--
      line 55, after "178" insert --threadably received on the projecting end of swing bolt 170--
      lines 64-65, "carriage assembly 110 is in its retracted relationship relative to" should be deleted.
Col. 7, line 16, after "82," insert --carriage 98, which is slidably mounted on bracket 82 and--
Col. 8, line 28 "of" should be --or--
      line 29 "100" should be --110--
Col. 9, line 19 "20" should be --204--
Col. 12, line 75 "of should be --on--
Col. 14, line 31 "if" should be --it--
Col. 16, line 28 (Claim 6) "i" should be --in--

Signed and sealed this 16th day of May 1972.

(SEAL)
Attest:

EDWARD M. FLETCHER, JR.            ROBERT GOTTSCHALK
Attesting Officer                  Commissioner of Patents